(12) United States Patent
Schattgen et al.

(10) Patent No.: US 10,421,506 B2
(45) Date of Patent: Sep. 24, 2019

(54) CANTILEVER EXTENSION FOR A TRAILER ASSEMBLY

(71) Applicant: Bull Moose Tube Company, Chesterfield, MO (US)

(72) Inventors: Matthew Martin Schattgen, Strawberry Point, IA (US); Rodney Dale Crim, Newcastle, OK (US); Timothy John McGreal, Manchester, IA (US); Jeffrey Wilcox Ingels, Maynard, IA (US)

(73) Assignee: Bull Moose Tube Company, Chesterfield, MO (US)

(*) Notice: Subject to any disclaimer, the term of this patent is extended or adjusted under 35 U.S.C. 154(b) by 40 days.

(21) Appl. No.: 15/496,459

(22) Filed: Apr. 25, 2017

(65) Prior Publication Data

US 2018/0304942 A1 Oct. 25, 2018

(51) Int. Cl.
*B62D 53/00* (2006.01)
*B62D 53/06* (2006.01)

(52) U.S. Cl.
CPC ......... *B62D 53/067* (2013.01); *B62D 53/061* (2013.01)

(58) Field of Classification Search
CPC .. B62D 61/125; B62D 53/067; B62D 53/061; B62D 53/068
See application file for complete search history.

(56) References Cited

U.S. PATENT DOCUMENTS

| | | | |
|---|---|---|---|
| 3,210,110 A * | 10/1965 | Chieger | B60R 19/56 105/132.1 |
| 3,895,818 A | 7/1975 | Fearon | |
| 3,910,601 A | 10/1975 | Michaud | |
| 3,977,691 A | 8/1976 | Robertson | |
| 4,132,326 A * | 1/1979 | Pinto | B62D 53/068 280/149.1 |
| 4,362,316 A * | 12/1982 | Wright | B62D 63/061 280/491.3 |
| 4,372,727 A | 2/1983 | Fredrickson et al. | |
| 4,423,884 A * | 1/1984 | Gevers | B62D 53/067 280/407.1 |
| 4,514,002 A * | 4/1985 | McIntosh | B60R 19/56 293/118 |
| 5,029,895 A * | 7/1991 | Anderson | E04G 21/0436 280/764.1 |
| 5,110,149 A | 5/1992 | Dahlstrom | |
| 5,242,185 A * | 9/1993 | Carr | B62D 53/061 280/423.1 |
| 5,306,113 A | 4/1994 | Mann | |

(Continued)

*Primary Examiner* — Hau V Phan
(74) *Attorney, Agent, or Firm* — Armstrong Teasdale LLP (57) ABSTRACT

A cantilever extension for a primary trailer is provided. The primary trailer includes a frame that extends from a hitch end to a rear end, and a primary trailer deck coupled to the primary trailer frame. The cantilever extension includes a cantilever deck. The cantilever extension is rotatably coupled to the primary trailer frame proximate to the rear end, and the cantilever extension is rotatable between a stow position, wherein the cantilever deck is oriented in a substantially face-to-face relationship with the primary trailer deck, and a deployed position, wherein the cantilever deck is oriented substantially co-planar with, and aft of, the primary trailer deck. The cantilever extension in the deployed position is supported solely via coupling to the primary trailer.

20 Claims, 5 Drawing Sheets

(56) References Cited

U.S. PATENT DOCUMENTS

| | | | |
|---|---|---|---|
| 6,050,578 A | 4/2000 | Beck | |
| 6,247,712 B1 | 6/2001 | Smith et al. | |
| 6,315,311 B1 * | 11/2001 | Mathiowetz | B62D 61/125 180/209 |
| 6,647,898 B2 | 11/2003 | Li | |
| 6,860,702 B1 | 3/2005 | Banks | |
| 7,658,587 B1 | 2/2010 | Dierks et al. | |
| 7,762,756 B1 | 7/2010 | Ablabutyan et al. | |
| 7,802,958 B2 | 9/2010 | Garcia et al. | |
| 7,857,331 B2 | 12/2010 | Walters, Jr. | |
| 9,260,045 B2 | 2/2016 | Chapman | |
| 9,266,458 B2 | 2/2016 | Michaud | |
| 9,315,138 B1 * | 4/2016 | Dierks | B60P 1/433 |
| 9,365,248 B1 | 6/2016 | Martin | |
| 2005/0220595 A1 | 10/2005 | Hull | |
| 2016/0096464 A1 | 4/2016 | Robertson | |

\* cited by examiner

CANTILEVER EXTENSION FOR A TRAILER ASSEMBLY

BACKGROUND

The field of the disclosure relates generally to tractor-trailer machines, and more particularly, to a cantilever extension for a trailer assembly.

At least some known trailer systems for transporting very long items include a trailer that is configured to support the weight of the item at several points along its length. For example, but not by way of limitation, the trailer is part of a trailer system to transport a blade for a wind turbine. Due to technological advances, a length of such wind turbine blades has been increasing at a rapid pace, which makes them extremely difficult to transport over the road. Moreover, a length of such trailer systems is subject to federal and state regulations, and over-length trailers typically incur additional regulatory fees during operation.

At least some known trailers are extendable between a non-overlength deck, such as 53 feet, and an extended deck length, such as 164 feet, 2 inches. However, modification of such known extendable trailers to include even longer decks would require a use of cranes to insert the extended deck, increasing a time and cost required to extend the deck. In addition, at least some known trailers include an extendable pull-out bumper portion that extends a length of the deck. However, a load-bearing capability of such known pull-out bumpers is limited beyond a pull-out length of about 20 feet.

In addition, at least some known trailers include a "flip axle" assembly coupled to a rear of the primary trailer deck. The flip axle assembly includes at least one axle and a decking portion configured to rotate between a stow position, atop the primary trailer deck, and a deployed position. The load on the extended deck is supported in the deployed position by the wheels of the flip axle in contact with the roadway. However, in at least some cases, use of a flip axle assembly increases the cost and weight of the trailer assembly, increases required turning forces, inhibits use of the primary trailer deck when the flip axle assembly is in the stow position, and inhibits use of a pullout bumper extension when used as part of a trailer assembly.

BRIEF DESCRIPTION

In one aspect, a cantilever extension for a primary trailer is provided. The primary trailer includes a frame that extends from a hitch end to a rear end, and a primary trailer deck coupled to the primary trailer frame. The cantilever extension includes a cantilever deck. The cantilever extension is rotatably coupled to the primary trailer frame proximate to the rear end, and the cantilever extension is rotatable between a stow position, wherein the cantilever deck is oriented in a substantially face-to-face relationship with the primary trailer deck, and a deployed position, wherein the cantilever deck is oriented substantially co-planar with, and aft of, the primary trailer deck. The cantilever extension in the deployed position is supported solely via coupling to the primary trailer.

In another aspect, a trailer assembly for a tractor-trailer machine is provided. The trailer assembly includes a primary trailer coupleable to the tractor at a hitch end. The primary trailer includes a primary trailer frame that extends from the hitch end to a rear end, and a primary trailer deck coupled to the primary trailer frame. The trailer assembly also includes a cantilever extension that includes a cantilever deck. The cantilever extension is rotatably coupled to the primary trailer frame proximate to the rear end, and the cantilever extension is rotatable between a stow position, wherein the cantilever deck is oriented in a substantially face-to-face relationship with the primary trailer deck, and a deployed position, wherein the cantilever deck is oriented substantially co-planar with, and aft of, the primary trailer deck. The cantilever extension in the deployed position is supported solely via coupling to the primary trailer.

DETAILED DESCRIPTION

The embodiments described herein include a rotatable cantilever extension coupled to a primary trailer. The cantilever extension is movable from a first, stow position atop the primary trailer deck to a second, deployed position that facilitates supporting an overlength load. For example, the primary trailer deck and the cantilever extension deck cooperate to support a wind turbine blade loading fixture, facilitating transportation of wind turbine blades. Moreover, the cantilever extension in the deployed position is supported solely via coupling to the primary trailer, without the need for additional axles to be in contact with the road surface. In some embodiments, a rotation mechanism coupled to the primary trailer and the cantilever extension is operable to quickly and automatically rotate the cantilever extension between the stow position and the deployed position. Additionally or alternatively, an underside of the cantilever trailer extension is configured to accommodate carriage of cargo over a covered portion of the primary deck when the cantilever extension is in the stow position.

In certain embodiments, the rotatable cantilever trailer extension also includes a pull-out bumper extension, such that a load-bearing length of the trailer can be further extended when the rotatable cantilever extension is in the deployed position. In some embodiments, the primary trailer has lighted signal devices at the rear end and the pull-out bumper has alternative lighted signal devices configured to operate when the cantilever trailer extension is in the deployed position, facilitating operation of the trailer system.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "front" refers to a forward or hitch end of a trailer assembly, and the term "rear" refers to a portion of the trailer assembly that is spaced apart from the hitch end of the trailer assembly in the direction opposite to the intended direction of travel of the trailer assembly when in use.

Figure 1:
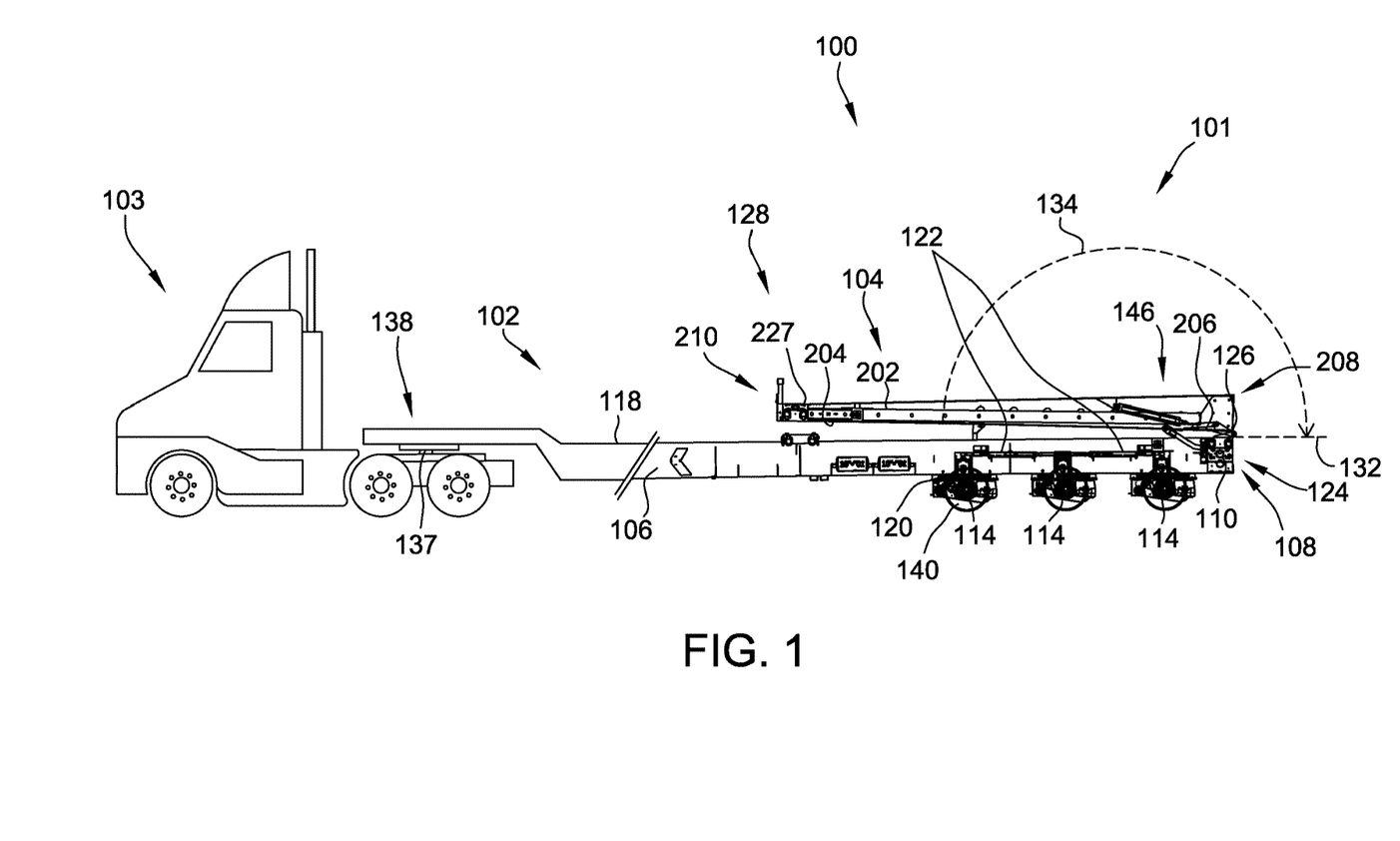
FIG. 1 is a schematic view of an exemplary tractor-trailer machine, illustrating an exemplary trailer assembly that includes an exemplary cantilever trailer extension in a first, stow position.
Figure 2:
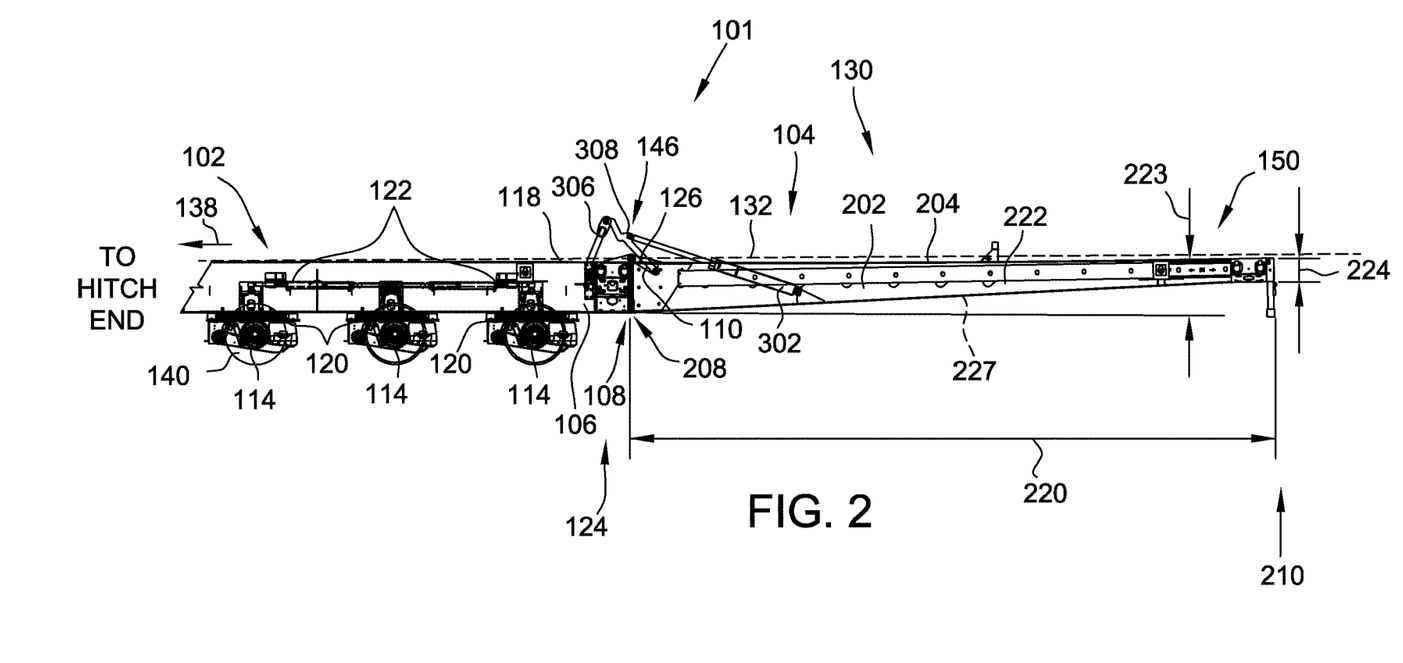
FIG. 2 is a partial side view of the trailer assembly shown in FIG. 1, illustrating the cantilever trailer extension in a second, deployed position.

FIG. 1 is a schematic view of an exemplary tractor-trailer machine 100. FIG. 2 is a partial side view of exemplary trailer assembly 101 illustrating exemplary cantilever trailer extension 104 in a second, deployed position 130. In the exemplary embodiment, tractor-trailer machine 100 is a wind turbine blade transport device. In alternative embodiments, tractor-trailer machine 100 is configured to carry other suitable over-length cargo. In still other alternative embodiments, tractor-trailer machine 100 is any tractor-trailer machine suitable for operation with a trailer assembly 101, as described below.

In the exemplary embodiment, tractor-trailer machine 100 includes a tractor 103 and trailer assembly 101. Trailer assembly 101 includes a cantilever trailer extension 104 that is rotatably coupled to a primary trailer 102 and is illustrated in a first, stow position 128. In the exemplary embodiment, a hitch end 138 of primary trailer 102 is coupled to tractor 103 at a hitch coupler 137, and extends between hitch end 138 and a rear end 124.

Cantilever trailer extension 104 is configured to be rotated through an approximately 180-degree range of motion, defined by a rotation angle 134, between stow position 128 and deployed position 130. In stow position 128, a deck 204 of cantilever trailer extension 104 is oriented in substantially face-to-face relationship with a primary trailer deck 118, while in deployed position 130, cantilever deck 204 is oriented substantially co-planar with, and aft of, primary trailer deck 118, such that decks 118 and 204 cooperate to define an overlength cargo transportation deck.

In the exemplary embodiment, trailer assembly 101 is a trailer configured for transporting wind turbine blades. Alternatively, trailer assembly 101 is any other trailer and/or transport device, including, without limitation, a heavy equipment trailer, and/or a bulk cargo trailer. Primary trailer 102 includes a primary trailer frame 106 that extends from hitch end 138 to rear end 124, and a primary trailer deck 118 coupled to a top of primary trailer frame 106. At least one axle 114, with at least one wheel 140 on each opposing side of axle 114, is coupled to primary trailer frame 106 by a suspension system 120. Suspension system 120 includes a plurality of hydraulic steering actuators 122 configured to position wheels 140 to facilitate steering trailer assembly 101.

Moreover, in some embodiments, primary trailer 102 is a suitable extendable trailer that is extendable from a primary base length to a primary extended length. For example, in one embodiment, primary base length is 53 feet, enabling hauling of non-overlength cargo, and primary extended length is 164 feet, 2 inches, enabling hauling of legacy wind turbine blades. In addition, although primary trailer 102 is illustrated as having a single frame 106 and deck 118, it should be understood that in alternative embodiments, primary trailer frame 106 and/or primary trailer deck 118 are formed from a plurality of suitable deck units and/or linked trailer units.

In the exemplary embodiment, cantilever extension 104 is rotatably coupled to primary trailer 102 at a hinge 108 proximate to rear end 124. In the exemplary embodiment, hinge 108 includes a plurality of primary trailer gussets 110, a plurality of cantilever extension gussets 206, and at least one hinge pin 126 extending through aligned openings (not numbered) defined in gussets 110 and 206. In alternative embodiments, hinge 108 includes any suitable structure that enables cantilever extension 104 to function as described herein. Further in the exemplary embodiment, a rotation mechanism 146 is coupled between primary trailer 102 and cantilever extension 104, and is operable to automatically move cantilever trailer extension 104 between stow position 128 and deployed position 130, as will be described herein.

In the exemplary embodiment, when cantilever extension 104 is in deployed position 130, each of primary trailer deck 118 and cantilever deck 204 is substantially co-planar with a deck plane 132. In the exemplary embodiment, cantilever trailer extension 104 includes a cantilever extension frame 202 that extends from a proximal end 208, adjacent to rear end 124 of primary trailer 102, to a distal end 210. A length 220 is defined between proximal end 208 and distal end 210. Cantilever deck 204 is coupled to an upper (with respect to deployed position 130) side of frame 202, and frame 202 includes an underside 227 opposite cantilever deck 204. Notably, cantilever extension 104 includes no axle assemblies or other load-bearing components configured to directly contact the road or ground in deployed position 130. Rather, a weight of cantilever extension 104, and any load supported on/by cantilever extension 104, in deployed position 130 is supported solely via coupling to primary trailer 102.

In the exemplary embodiment, frame 202 includes a plurality of beam members 222 that each extend longitudinally between proximal end 208 and distal end 210. Each beam member 222 is shaped to facilitate transfer of static (weight) and dynamic loads exerted by a cargo (not shown) on cantilever deck 204 in deployed position 130 to rear end 124 of primary trailer 102. For example, in the exemplary embodiment, each member 222 is tapered from a greater thickness 223 at proximal end 208 to a lesser thickness 224 at distal end 210. Further in the exemplary embodiment, each beam member 222 includes lightening cutouts 212 defined therethrough and positioned to reduce a weight of beam members 222 while maintaining a predetermined structural stiffness and load-bearing capacity of frame 202. In alternative embodiments, frame 202 includes any suitable structure that enables cantilever extension 104 to function as described herein.

Figure 3:
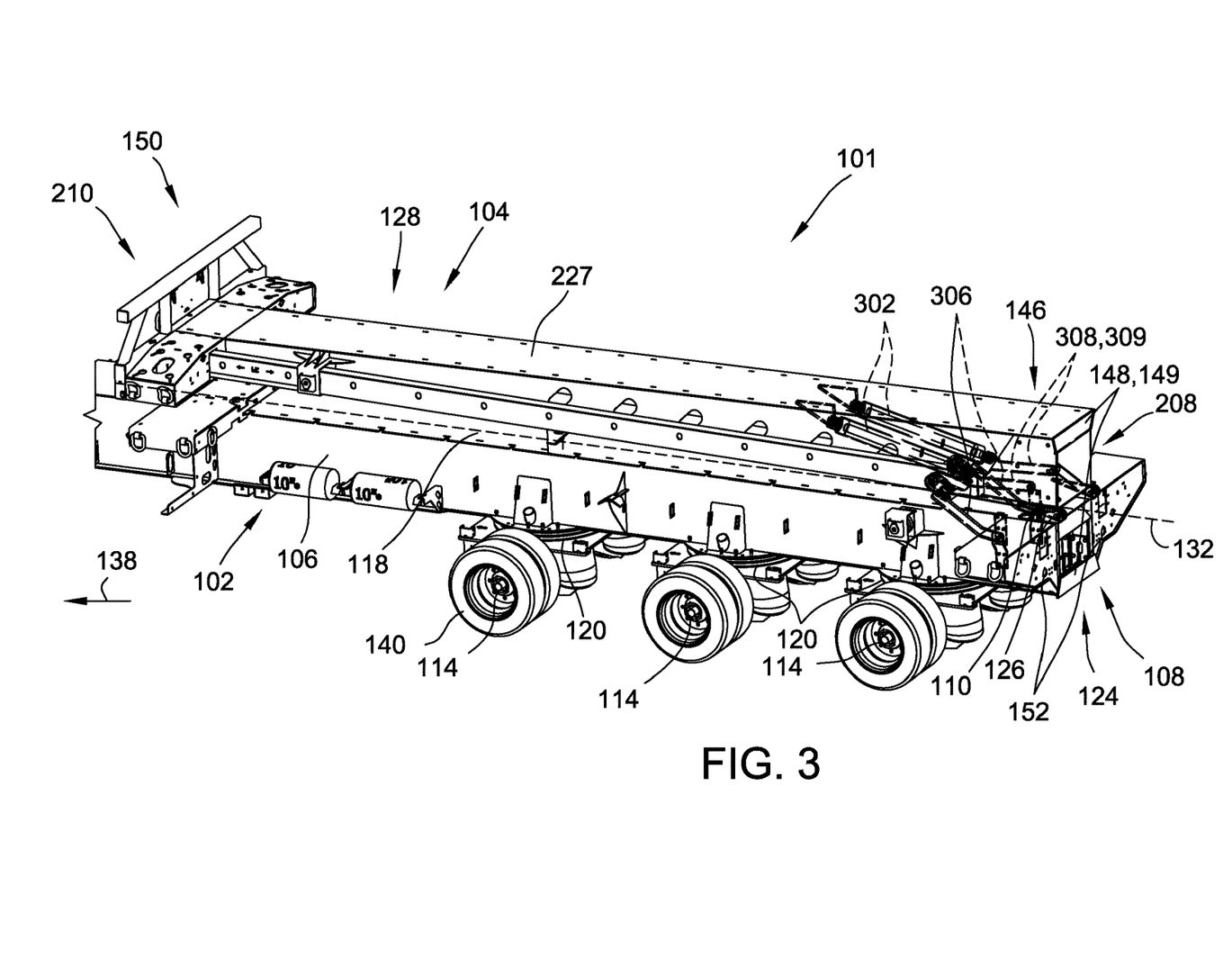
FIG. 3 is a perspective view of the trailer assembly shown in FIG. 2, illustrating the cantilever trailer extension in the stow position.

FIG. 3 is a partial perspective view of trailer assembly 101 illustrating cantilever trailer extension 104 in stow position 128. In the exemplary embodiment, when cantilever extension 104 is in stow position 128, primary trailer deck 118 is substantially co-planar with deck plane 132 and cantilever deck 204 is atop, and in a plane substantially parallel with, deck plane 132. In the exemplary embodiment, at least a portion of underside 227 of cantilever extension 104 extends unobstructed from proximal end 208 forward to distal end 210. As such, underside 227 of cantilever extension 104 is configured to accommodate cargo on or above underside 227 when cantilever extension 104 is in stow position 128, improving a range of cargo that can be hauled by trailer assembly 101 when cantilever trailer extension 104 is in stow position 128. In alternative embodiments, underside 227 of cantilever extension 104 is not configured to accommodate cargo.

In the exemplary embodiment, cantilever trailer extension 104 includes a shim system 148. Shim system 148 is configured to enable positioning and retention of at least one shim (not shown) between primary trailer rear end 124 and cantilever extension proximal end 208, such that the at least one shim adjusts angle 134 of cantilever trailer extension 104 in deployed position 130. In the exemplary embodiment, shim system 148 includes a pair of compression plates 149 coupled respectively to primary trailer rear end 124 and cantilever extension proximal end 208, such that the compression plates 149 approach each other in an approximately face-to-face relationship as cantilever extension proximal end 208 is rotated into deployed position 130. Compression plates 149 are shaped to retain and compress at least one shim therebetween when cantilever trailer extension 104 is in deployed position 130, and a number of shims inserted between compression plates 149 is selectable to finely adjust angle 134 of cantilever trailer extension 104 in deployed position 130. For example, shim system 148 is used to adjust rotation angle 134 in response to varying deflection of cantilever trailer extension 104 due to weight of different loads on cantilever trailer extension 104, and/or to facilitate inhibiting contact between cantilever trailer extension 104 and a turbine blade at undesired locations. In alternative embodiments, shim system 148 includes any suitable structure that enables cantilever trailer extension 104 to function as described herein. In other alternative embodiments, cantilever trailer extension 104 does not include shim system 148.

Figure 4:
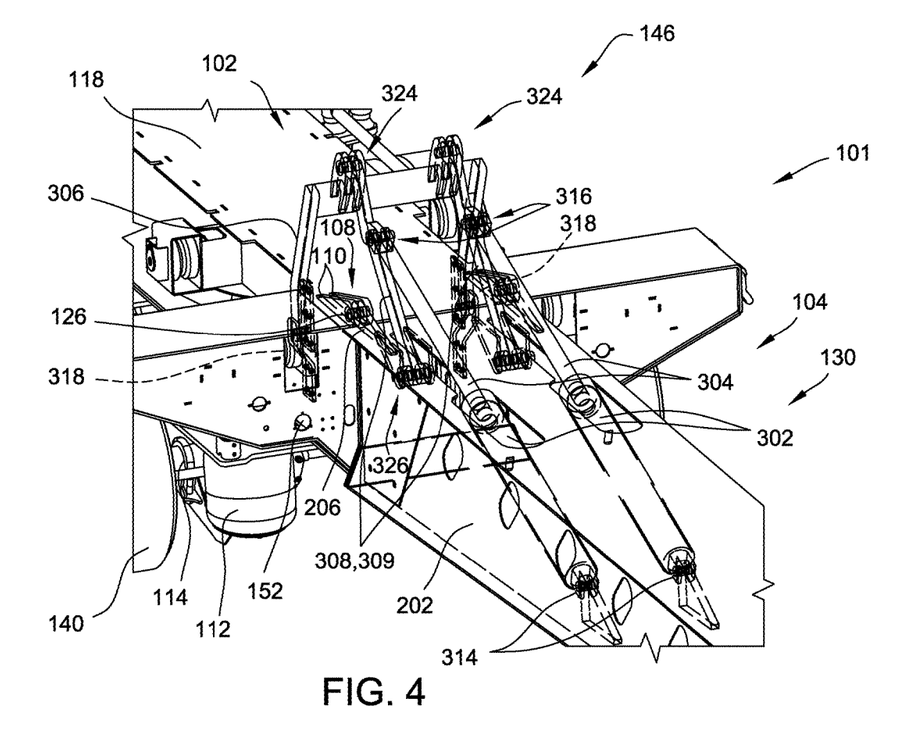
FIG. 4 is a perspective view of an exemplary rotation mechanism that may be used with the cantilever trailer extension shown in FIGS. 1-3, illustrating the cantilever trailer extension in the second, deployed position.

FIG. 4 is a perspective view of an exemplary embodiment of rotation mechanism 146, illustrating rotation mechanism 146 with cantilever trailer extension 104 in deployed position 130. Rotation mechanism 146 is operable to automatically rotate cantilever extension 104 between stow position 128 and deployed position 130. With reference to FIGS. 2-4, in certain embodiments, rotation mechanism 146 includes a first linkage member 306 pivotably coupled to frame 106, a second linkage member 308 pivotably coupled between first linkage member 306 and cantilever extension frame 202, and at least one hydraulic actuator 302 pivotably coupled between second linkage member 308 and cantilever extension frame 202. The at least one hydraulic actuator 302 is selectively operable to extend and retract between second linkage member 308 and cantilever extension frame 202, such that cantilever extension 104 is rotated between deployed position 130 and stow position 128. Second linkage member 308 is configured to move an end of the at least one hydraulic actuator 302 coupled thereto from aft of hinge 108 to forward of hinge 108 as distal end 210 of cantilever trailer extension 104 moves from aft of hinge 108 to forward of hinge 108, and vice versa, facilitating controlled support of a weight of cantilever trailer extension 104 by the at least one hydraulic actuator 302 throughout the transition between stow position 128 and deployed position 130. In alternative embodiments, rotation mechanism 146 includes any suitable structure that enables cantilever extension 104 to function as described herein.

For example, in the exemplary embodiment, first linkage member 306 includes two uprights 320 coupled to primary trailer frame 106 at respective pinned couplings 318, and a crossbar 322 extending therebetween. Second linkage member 308 includes two contoured bar members 309 each coupled at one end to crossbar 322 at respective pinned joints 324, and at the other end to cantilever extension frame 202 at respective pinned joints 326. The at least one hydraulic actuator 302 includes two hydraulic actuators 302 each coupled to cantilever extension frame 202 at respective pinned couplings 314, and to respective contoured bar members 309 at respective pinned couplings 316. In alternative embodiments, each of first linkage member 306, second linkage member 308, and the at least one hydraulic actuator 302 includes any suitable structure that enables rotation mechanism 146 to function as described herein.

Figure 5:
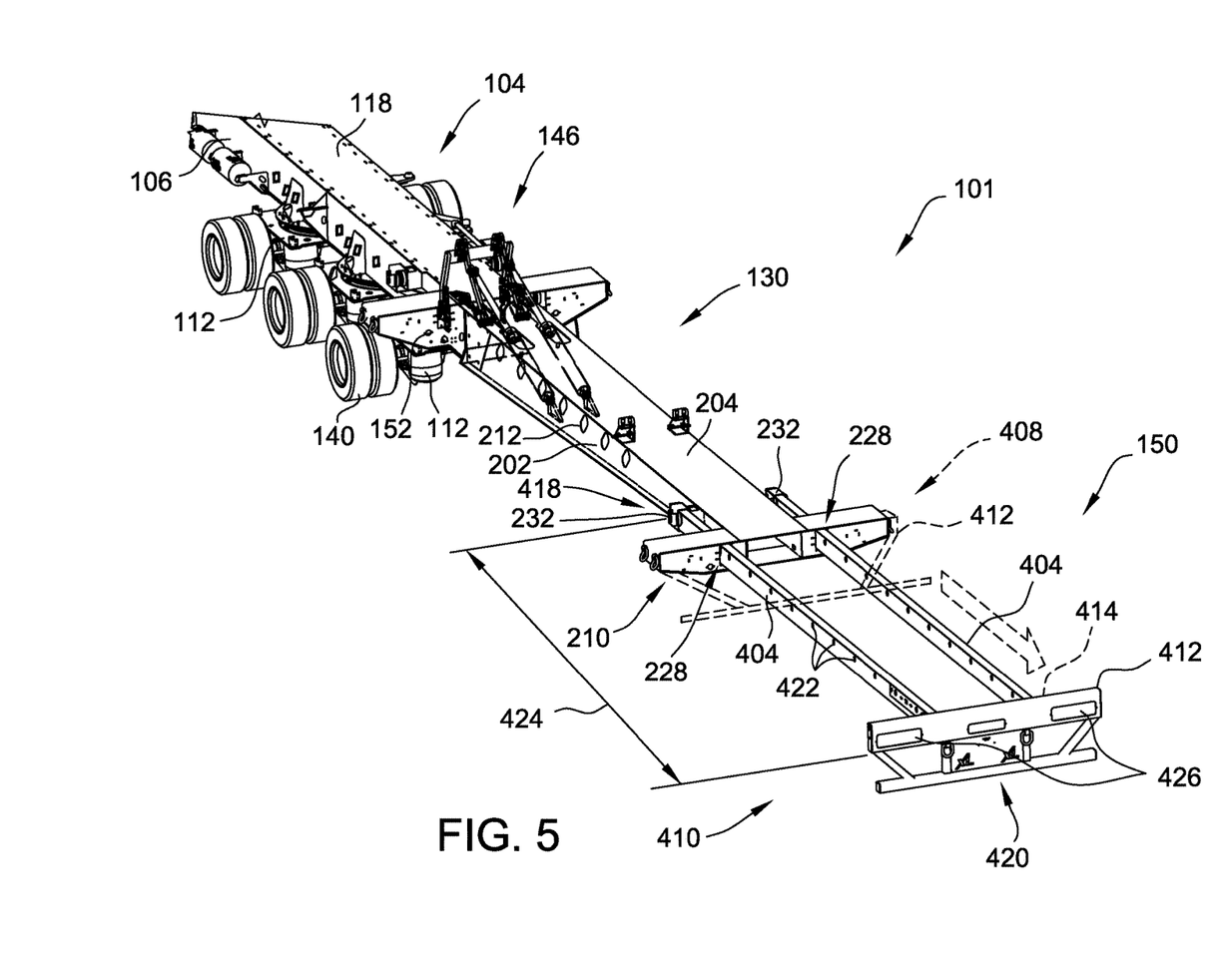
FIG. 5 is a perspective view of an exemplary pull-out bumper that may be used with the trailer assembly shown in FIGS. 2 and 3, illustrating the pull-out bumper in a second, extended position.

FIG. 5 is a perspective view of an exemplary pull-out bumper assembly 150 coupled to cantilever trailer extension 104 and in a second, extended position 410. Pull-out bumper assembly 150 is selectively extendable from distal end 210 of cantilever trailer extension 104, such that additional length is added to cantilever trailer extension 104. More specifically, pull-out bumper assembly 150 is selectively movable between a first, retracted position 408 (shown in dashed lines) and extended position 410. For example, in the exemplary embodiment, pull-out bumper assembly 150 in extended position 410 adds about 20 feet in usable length to cantilever deck 204.

For example, in the exemplary embodiment, pull-out bumper assembly 150 includes at least one extension arm 404 and a bumper 412. In the exemplary embodiment, the at least one extension arm includes a pair of extension arms 404. Each extension arm 404 extends from a proximal end 418 to an opposite distal end 414, and each distal end 414 is coupled to bumper 412. Each extension arm 404 is slidably coupled to cantilever extension frame 202 to enable pull-out bumper assembly 150 to translate between retracted position 408 and extended position 410. For example, cantilever extension 104 includes at least one slot 228 defined in distal end 210 and configured to cooperate with the at least one extension arm 404. More specifically, with pull-out bumper assembly 150 in retracted position 408, bumper 412 is positioned adjacent to distal end 210 and extension arms 404 extend forward from bumper 412 within respective slots 228.

Further, in the exemplary embodiment, at least one of first extension arm 404 and second extension arm 406 includes a plurality of position stops 422 positioned to selectively lock pull-out bumper assembly 150 at each of retracted position 408, extended position 410, and a plurality of corresponding intermediate positions between retracted position 408 and extended position 410. For example, position stops 422 are openings extending through at least one of first extension arm 404 and second extension arm 406, each configured to selectively receive a suitable bumper lock 232 therethrough. Bumper lock 232 is rigidly coupled to cantilever extension frame 202, such that pull-out bumper assembly 150 is secured with respect to cantilever extension frame 202. Notably, pull-out bumper assembly 150 in each of retracted position 408, extended position 410, and the plurality of intermediate positions corresponding to position stops 422 includes no axle assemblies or other load-bearing components configured to directly contact the road or ground. Rather, a weight of pull-out bumper assembly 150 is supported solely via coupling to cantilever trailer extension 104, and thus through primary trailer 102. In alternative embodiments, pull-out bumper assembly 150 includes any suitable structure that enables pull-out bumper assembly 150 to function as described herein. In other alternative embodiments, cantilever trailer extension 104 does not include pull-out bumper assembly 150.

In the exemplary embodiment, primary trailer 102 includes a first plurality of lighted signal devices 152 positioned at primary trailer rear end 124. Bumper 412 of pull-out bumper assembly includes a second plurality of lighted signal devices 426 positioned on bumper 412. Each of first signal devices 152 is configured to operate when cantilever trailer extension 104 is in stow position 128, and each of second signal devices 426 is configured to operate when cantilever trailer extension is in deployed position 130. In alternative embodiments, cantilever trailer extension 104 does not include pull-out bumper assembly 150, and second lighted signal devices 426 are coupled to cantilever trailer extension distal end 210. In other alternative embodiments, each of primary trailer 102 and cantilever trailer extension 104 includes any suitable number and arrangement of lighted signal devices that enables trailer assembly 101 to function as described herein.

The above-described embodiments include a cantilever extension for coupling to a primary trailer. The cantilever extension is rotatable between a stow position atop the primary trailer and a deployed position. The cantilever extension in the deployed position cooperates with the primary trailer to enable transport of an overlength cargo, such as but not limited to a wind turbine blade. The cantilever extension provides advantages over at least some known trailer systems for overlength cargo. Specifically, a weight of the cargo on the cantilever extension is supported entirely via the coupling to the primary trailer, thus eliminating the need for a supporting axle on the cantilever extension. The absence of the additional supporting axle reduces a cost and improves a steering capability of the trailer system, and also increases a cargo capacity of the primary trailer when the cantilever extension is in the stow position. Also specifically, in certain embodiments, the cantilever extension includes a pull-out bumper deployable from the rear of the cantilever extension to further increase a length of the available deck space of the trailer system. Thus, the trailer system provides a range of effective deck lengths to reduce regulatory costs associated with overlength cargo, while accommodating each type of over-length cargo, such as but not limited to shorter legacy wind turbine blades and longer, newer wind turbine blades.

Exemplary embodiments of trailer systems are described above in detail. The disclosure is not limited to the specific embodiments described herein, but rather, components of systems and steps of methods may be utilized independently and separately from other components and/or steps described herein. For example, the cantilever extension may also be used in combination with other primary trailers and tractor-trailer machines, and is not limited to practice with only the primary trailer described herein. Rather, the exemplary embodiments can be implemented and utilized in connection with many other tractor-trailer machine applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cantilever extension for a primary trailer, the primary trailer including a frame that extends from a hitch end to a rear end a primary trailer deck coupled to the primary trailer frame, and a hinge coupled to the primary trailer frame proximate the rear end, said cantilever extension comprising a cantilever deck and a cantilever extension frame, said cantilever extension frame extends from a proximal end adjacent the rear end of the primary trailer to a distal end, wherein said cantilever frame is tapered from a greater thickness at said proximal end to a lesser thickness at said distal end, said cantilever extension rotatably coupled to the primary trailer frame via the hinge, said cantilever extension is rotatable between a stow position, wherein said cantilever deck is oriented in a substantially face-to-face relationship with the primary trailer deck, and a deployed position, wherein said cantilever deck is oriented substantially co-planar with, and aft of, the primary trailer deck, and wherein said cantilever extension in said deployed position abuts the primary trailer frame and is supported solely via the primary trailer.

2. The cantilever extension in accordance with claim 1, further comprising a rotation mechanism operable to automatically rotate said cantilever extension between the stow position and the deployed position.

3. The cantilever extension in accordance with claim 2, wherein said rotation mechanism comprises:
   a first linkage member pivotably coupled to the primary trailer frame;
   a second linkage member pivotably coupled between said first linkage member and said cantilever extension frame; and
   at least one hydraulic actuator pivotably coupled between said second linkage member and said cantilever extension frame, said at least one hydraulic actuator is selectively operable to extend and retract between said second linkage member and said cantilever extension frame such that said cantilever extension is rotated between the deployed position and the stow position.

4. The cantilever extension in accordance with claim 1, wherein said cantilever deck has a length of at least about 26 feet.

5. The cantilever extension in accordance with claim 1, wherein the primary deck is extendable from a primary base length to a primary extended length of at least about 164 feet, and said cantilever deck has a length of at least about 26 feet.

6. The cantilever extension in accordance with claim 1, wherein said cantilever trailer extension further comprises an underside opposite said cantilever deck, said underside is configured to accommodate cargo when said cantilever extension is in the stow position.

7. The cantilever extension in accordance with claim 1, further comprising a pullout bumper assembly coupled to a distal end of said cantilever extension, said pullout bumper assembly is selectively extendable from a distal end of said cantilever trailer extension.

8. The cantilever extension in accordance with claim 7, wherein said cantilever extension further comprises a cantilever extension frame, and said pullout bumper assembly comprises:
 at least one extension arm slidably coupled to said cantilever extension frame; and
 a bumper coupled to a distal end of said at least one extension arm.

9. The cantilever extension in accordance with claim 7, wherein said primary deck is extendable to a primary extended length of at least about 164 feet, said cantilever deck has a length of at least about 26 feet, and said pullout bumper assembly is extendable to a length of at least about 19 feet from said distal end.

10. A trailer assembly for a tractor-trailer machine, said trailer assembly comprising:
 a primary trailer coupleable to the tractor at a hitch end, said primary trailer comprising:
  a primary trailer frame that extends from said hitch end to a rear end;
  a primary trailer deck coupled to said primary trailer frame; and
  a hinge coupled to said primary trailer frame proximate to said rear end; and
 a cantilever extension comprising a cantilever deck and a cantilever extension frame, said cantilever extension frame extends from a proximal end adjacent said rear end of said primary trailer to a distal end, wherein said cantilever extension frame is tapered from a greater thickness at said proximal end to a lesser thickness at said distal end, said cantilever extension rotatably coupled to said primary trailer frame via said hinge, said cantilever extension is rotatable between a stow position, wherein said cantilever deck is oriented in a substantially face-to-face relationship with said primary trailer deck, and a deployed position, wherein said cantilever deck is oriented substantially co-planar with, and aft of, said primary trailer deck, and wherein said cantilever extension in said deployed position abuts said primary trailer frame and is supported solely via said primary trailer.

11. The trailer assembly in accordance with claim 10, further comprising a rotation mechanism operable to automatically rotate said cantilever deck between the stow position and the deployed position.

12. The trailer assembly in accordance with claim 11, wherein said rotation mechanism comprises:
 a first linkage member pivotably coupled to said primary trailer frame;
 a second linkage member pivotably coupled between said first linkage member and said cantilever extension frame; and
 at least one hydraulic actuator pivotably coupled between said second linkage member and said cantilever extension frame, said at least one hydraulic actuator is selectively operable to extend and retract between said second linkage member and said cantilever extension frame such that said cantilever extension is rotated between the deployed position and the stow position.

13. The trailer assembly in accordance with claim 10, wherein said cantilever deck has a length of at least about 26 feet.

14. The trailer assembly in accordance with claim 10, wherein said primary deck is extendable from a primary base length of at least about 53 feet to a primary extended length of at least about 164 feet.

15. The trailer assembly in accordance with claim 10, wherein said cantilever trailer extension further comprises an underside opposite said cantilever deck, said underside is configured to accommodate cargo when said cantilever extension is in the stow position.

16. The trailer assembly in accordance with claim 10, further comprising a pullout bumper assembly coupled to a distal end of said cantilever extension, said pullout bumper assembly is selectively extendable from a distal end of said cantilever trailer extension.

17. The trailer assembly in accordance with claim 16, wherein said pullout bumper assembly comprises:
 at least one extension arm slidably coupled to said cantilever extension frame; and
 a bumper coupled to a distal end of said at least one extension arm.

18. The trailer assembly in accordance with claim 17, wherein said primary trailer further includes a first plurality of lighted signal devices positioned at said rear end and configured to operate when said cantilever trailer extension is in the stow position, said pullout bumper assembly further comprises a second plurality of lighted signal devices positioned on said bumper and configured to operate when said cantilever trailer extension is in the deployed position.

19. The trailer assembly in accordance with claim 16, wherein said primary deck is extendable to a primary extended length of at least about 164 feet, said cantilever deck has a length of at least about 26 feet, and said pullout bumper assembly is extendable to a length of at least about 19 feet from said distal end.

20. A trailer assembly for a tractor-trailer machine, said trailer assembly comprising:
 a primary trailer coupleable to the tractor at a hitch end, said primary trailer comprising:
  a primary trailer frame that extends from said hitch end to a rear end;
  a primary trailer deck coupled to said primary trailer frame; and
  a hinge coupled to said primary trailer frame proximate to said rear end;
 a cantilever extension comprising a cantilever deck and a cantilever extension frame, said cantilever extension rotatably coupled to said primary trailer frame via said hinge, said cantilever extension is rotatable between a stow position, wherein said cantilever deck is oriented in a substantially face-to-face relationship with said primary trailer deck, and a deployed position, wherein said cantilever deck is oriented substantially co-planar with, and aft of, said primary trailer deck, and wherein said cantilever extension in said deployed position abuts said primary trailer frame and is supported solely via said primary trailer; and
 a rotation mechanism operable to automatically rotate said cantilever deck between the stow position and the deployed position, said rotation mechanism comprising:
  a first linkage member pivotably coupled to said primary trailer frame;
  a second linkage member pivotably coupled between said first linkage member and said cantilever extension frame; and
  at least one hydraulic actuator pivotably coupled between said second linkage member and said cantilever extension frame, said at least one hydraulic actuator is selectively operable to extend and retract between said second linkage member and said cantilever extension frame such that said cantilever extension is rotated between the deployed position and the stow position.

\* \* \* \* \*